C. A. WAITZ.
AIR SYSTEM FOR FORCING LIQUIDS.
APPLICATION FILED DEC. 6, 1915.

1,221,637.

Patented Apr. 3, 1917.
2 SHEETS—SHEET 1.

Inventor
Charles A. Waitz
By
Attorney

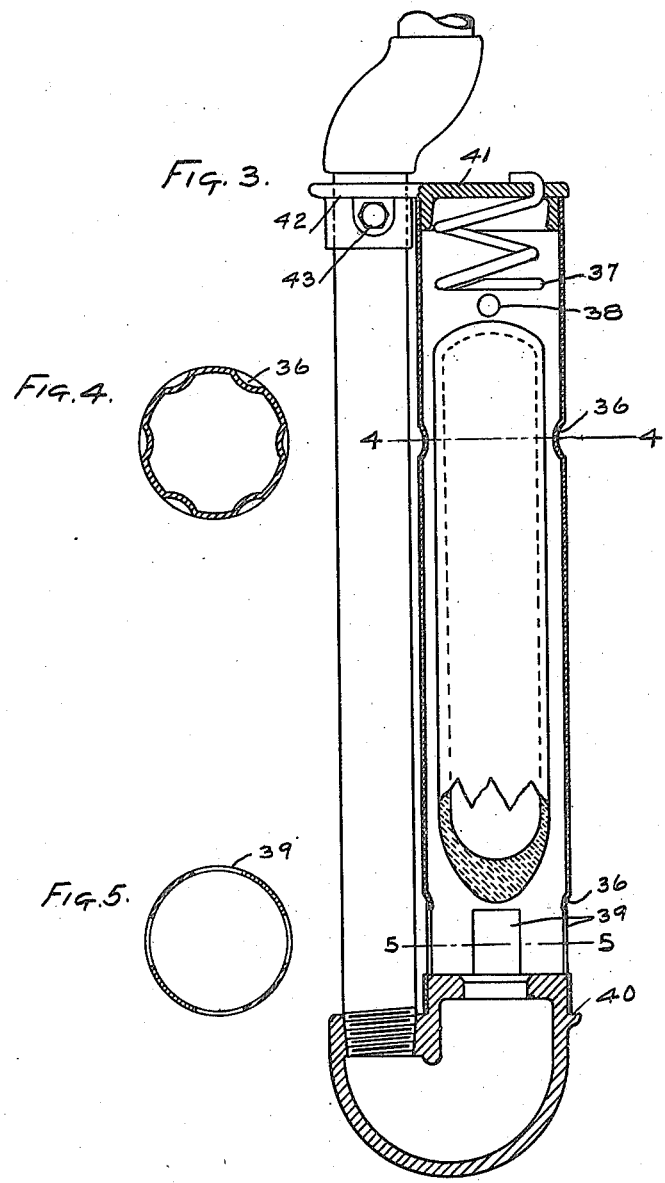

UNITED STATES PATENT OFFICE.

CHARLES A. WAITZ, OF ROUSEVILLE, PENNSYLVANIA.

AIR SYSTEM FOR FORCING LIQUIDS.

1,221,637.

Specification of Letters Patent.

Patented Apr. 3, 1917.

Application filed December 6, 1915. Serial No. 65,164.

*To all whom it may concern:*

Be it known that I, CHARLES A. WAITZ, a citizen of the United States, residing at Rouseville, in the county of Venango and State of Pennsylvania, have invented new and useful Improvements in Air Systems for Forcing Liquids, of which the following is a specification.

This invention relates to air systems for forcing liquids and consists in certain improvements in the construction thereof as will be hereinafter fully described and pointed out in the claims.

The invention is particularly adapted for forcing liquids from Artesian wells, especially oil wells, and is so illustrated in the following drawings wherein—

Figure 1:
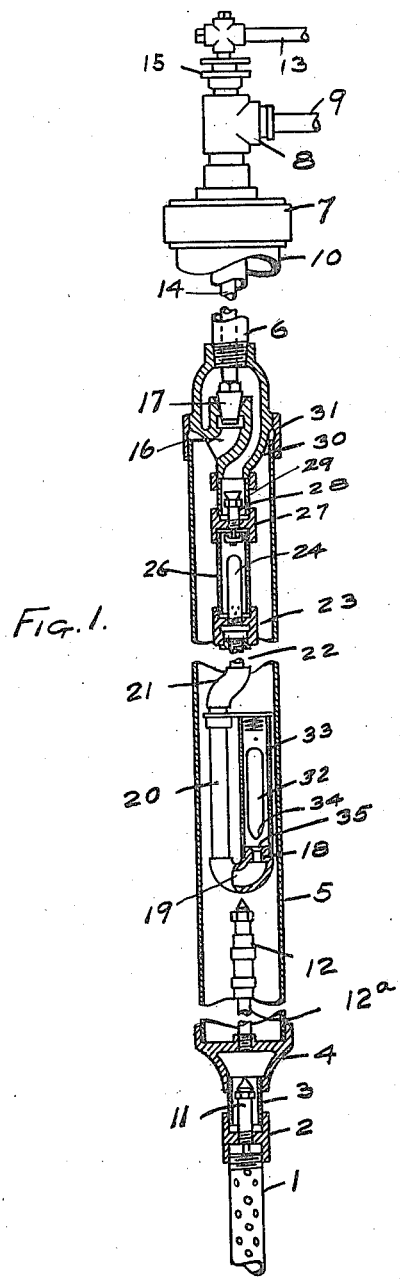
Figure 2:
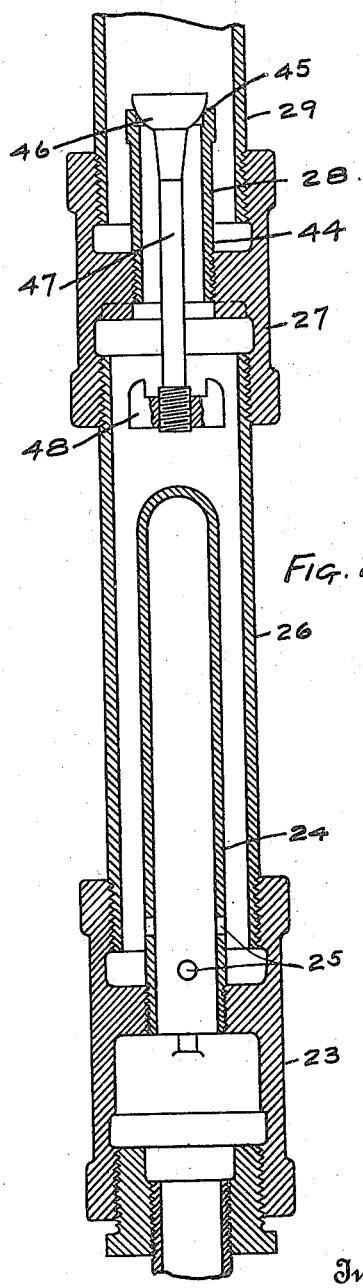

Figure 1 shows a vertical central section of a well system,

Fig. 2 an enlarged view of the air cushion used in said system,

Fig. 3 an enlarged view of the float valve used in said system with its guides and adjacent parts, Fig. 4 a section on the line 4—4 in Fig. 3, Fig. 5 a section on the line 5—5 in Fig. 3.

1 marks the strainer, 2 the fitting in which the upper end of the strainer is attached, 3 the nipple connecting the strainer with the bottom 4 of the float chamber or working barrel, 5 the tubing forming the float chamber, 6 the discharge conduit ordinarily termed a tubing leading from the float chamber, 7 a casing head, 8 a T for the upper end of the conduit 6, and 9 the discharge pipe. The usual casing 10 is arranged in the head 7.

A check or standing valve 11 is arranged in the fitting 2 and a second check or standing valve 12 is arranged in the bottom 4. The check 12 is carried by a pipe 12ª a considerable distance above the bottom 4 so as to permit a space for the delivery of sand at the bottom of the float chamber thus extending the period to which the apparatus may be operated without cleaning out the sand.

Air is delivered by a pipe 13, thence by way of a pipe 14 through the gland 15 to the bypass 16 leading to the float chamber, the air pipe having a tapered end 17 making a joint with the upper end of the bypass so that the air pipe may be readily pulled and put back in place without pulling the float chamber. In the discharge of liquid from the float chamber it is first carried through the passage 18, thence by U-bend 19 to the vertical or up-standing pipe 20 through the offset 21, pipe 22, and fitting 23 into the air cushion 24. The air cushion, as will be noted in Fig. 2, is an up-standing tube with its upper end closed and the liquid is forced into the lower end of it so that the air cushion is subjected to the momentum of the liquid for increasing the compression of the air in the cushion. The liquid passes from the air cushion by way of the lateral passages 25, thence up through the pipe 26 through the fitting 27, check valve 28, pipe 29 to the offset 30. A coupling 31 makes a closure between the upper end of the tubing 5 of the float chamber and the bypass fitting carrying the bypasses 30 and 16. The liquid passes from the bypass 30 to the tubing 6.

A float 32 is arranged in the vertical guide cylinder 33. It has a valve surface 34 at its lower end which is adapted to operate upon the seat 35 at the entrance to the passage 18. The guide cylinder 33 has the indentations 36 so as to keep the float in alinement within the guide cylinder. A spring 37 is arranged at the upper end of the guide cylinder and forms a cushion for the float. An opening 38 is also provided to prevent the trapping of air in the upper end of the float chamber. Openings 39 are provided at the lower end of the cylinder so that the liquid in the cylinder may follow the level of the liquid in the float chamber. The cylinder is slipped over the end of the U-bend and rests on the shoulder 40. It has the cover or cap 41 with an extension 42 extending around the vertical pipe 20. The cap is clamped in place by a set screw 43. The float, it will be noted, is cylindrically shaped with crowned ends. This shape permits of the use of glass as a material from which the float may be made. The float chamber in deep wells is subjected to very high pressure and the crushing strength of glass is very great providing it can be equally distributed. The valve surface arranged at the lower end is also particularly desirable formed of glass as it can be readily ground to surface. I prefer to make the walls immediately back of the valve surface thicker than the remaining wall so as to sustain the strain of seating.

The different valves 11, 12 and 28 are of the same general construction each having an upright pipe as 44 ending in a seat 45.

The valve disk or ball 46 operates on the seat 45 and has a downwardly extending stem 47 with a spider-shaped stop 48 at the bottom. By this construction the use of a cage at the top is obviated and in consequence any plugging or interference by reason of the lodgment of sand is obviated.

In operating the pump, liquid flows into the float chamber 5 by gravity, filling this chamber. The float 32 is lifted as the liquid rises above the level of this float. Air is turned in through the pipe 13, pipe 14 and bypass 16. This forces the liquid out through the passage 20 past the valve 28. As soon as the float chamber 5 has been discharged to the level of the float 32, the float closes the passage 35 and prevents any further discharge. The pressure is then released by way of the pipe 13, pipe 14 and bypass 16 permitting the float chamber 5 to refill. The valve 28 prevents a return flow of the liquid from the tubing.

By providing the air cushion the seating of the float and locking of the same in closed position is obviated. Without the air cushion the inertia of the moving column of liquid is sufficient to carry a sufficient amount of liquid past the check 28 to form a partial vacuum in the intervening conduit between the check 28 and the float valve and as a result if there is no leakage of the float valve or check valve the float valve is locked in position on its seat. With the air cushion the air under pressure in the cushion is sufficient to compensate for any such over-running of the liquid in the conduit and to thus prevent the locking of the float valve in the manner described.

What I claim as new is:—

1. In an air system for forcing liquids, the combination of a barrel; means for supplying air under pressure to the barrel to move the liquid; a discharge conduit for the liquid leading from the barrel; a check valve in the conduit to prevent a return flow of liquid; a float valve closing the entrance to the conduit to the air; and an air cushion in the conduit between the float valve and the check valve.

2. In an air system for forcing liquids, the combination of a barrel; means for supplying air under pressure to the barrel to move the liquid; a discharge conduit for the liquid leading from the barrel; a check valve in the conduit to prevent a return flow of liquid; a float valve closing the entrance to the conduit to the air; and an air cushion in the conduit between the float valve and the check valve, the entrance to the air cushion being in the direction of the flow of liquid to subject the air in the air cushion to the momentum of the passing liquid.

3. In an air system for forcing liquids, the combination of a barrel; means for supplying air under pressure to the barrel to move the liquid; a discharge conduit for the liquid leading from the barrel; a check valve in the conduit to prevent a return flow of liquid; a float valve closing the entrance to the conduit to the air; and an air cushion in the conduit between the float valve and the check valve, said air cushion comprising a fitting forming a portion of the conduit and a closed tube extending upwardly from the fitting, said tube having lateral openings extending from its lower end.

4. In an air system for forcing liquids, the combination of a float chamber; means for supplying air under pressure to the chamber; a discharge conduit leading from the chamber; a valve seat at the entrance to the conduit; and a one-piece cylindrically shaped glass float having crowned ends, one of the ends forming a valve surface, the wall of the float back of the surface being thickened.

In testimony whereof I have hereunto set my hand.

CHARLES A. WAITZ.